Feb. 6, 1973   W. L. NORTH ET AL   3,715,064
GARMENT FINISHING APPARATUS
Filed Feb. 10, 1971   5 Sheets-Sheet 1

INVENTORS:
GEORGE S. EUBANK,
WILLIAM L. NORTH,
BY
ATTORNEYS.

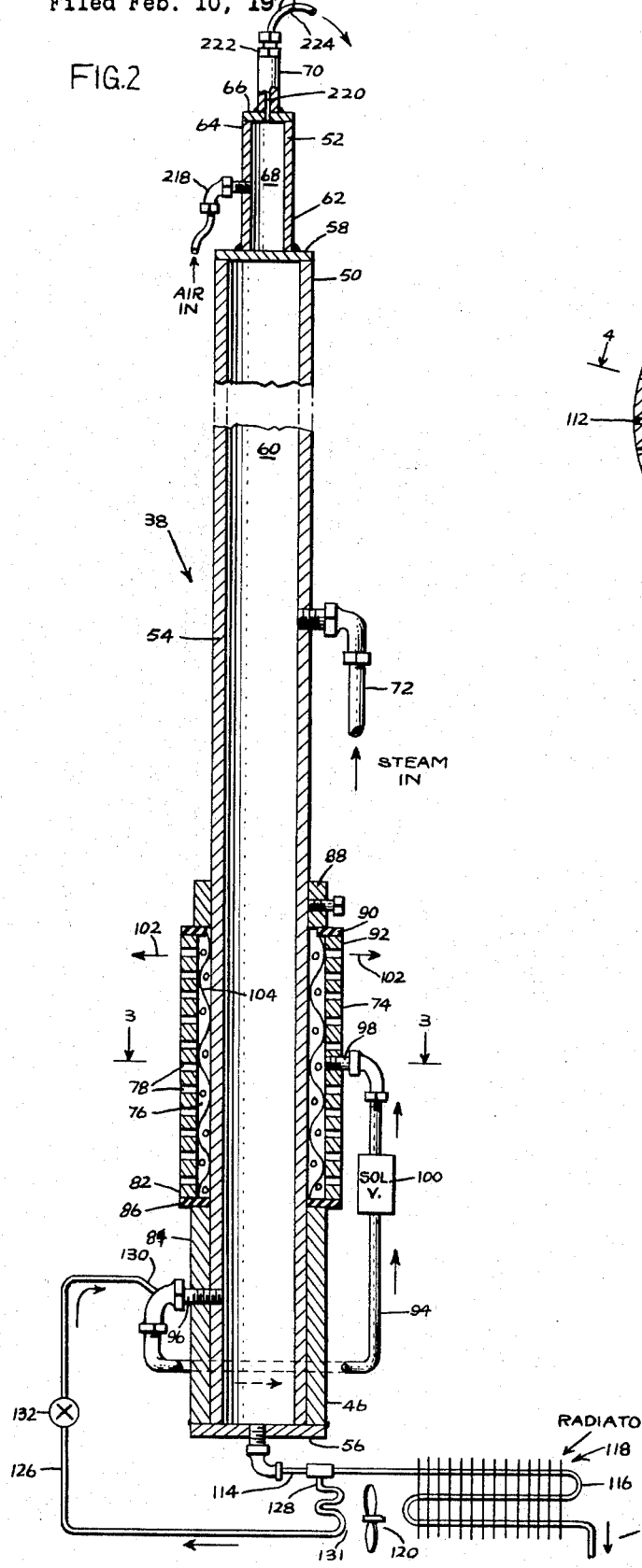
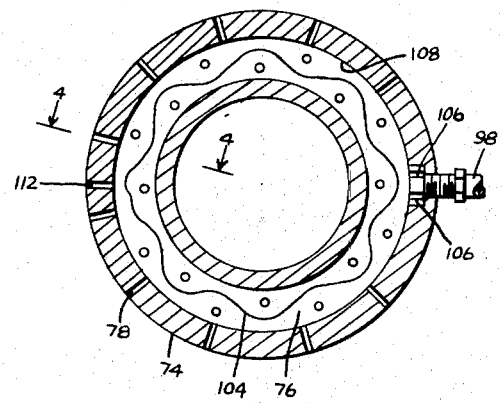
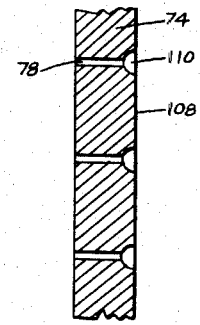

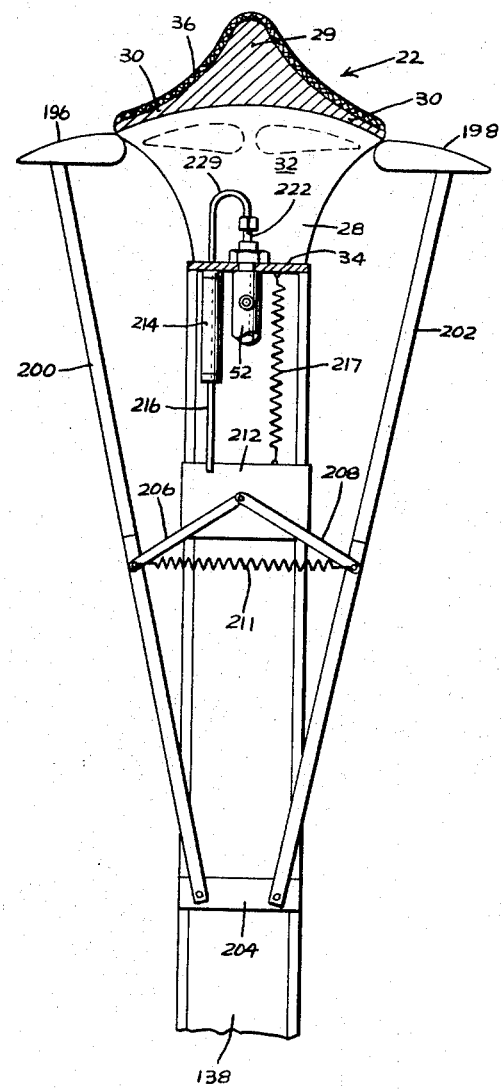
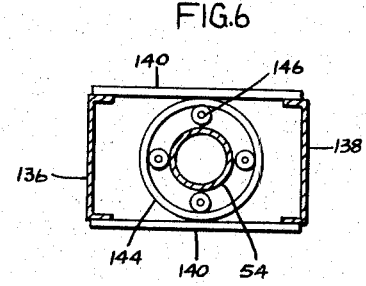
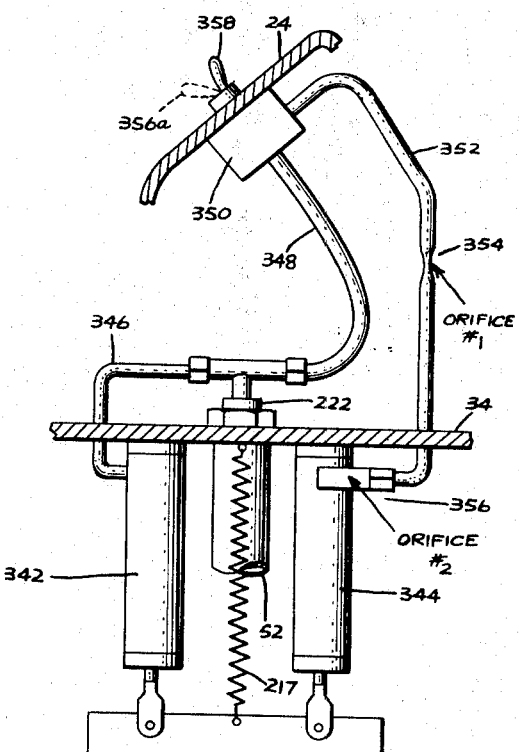
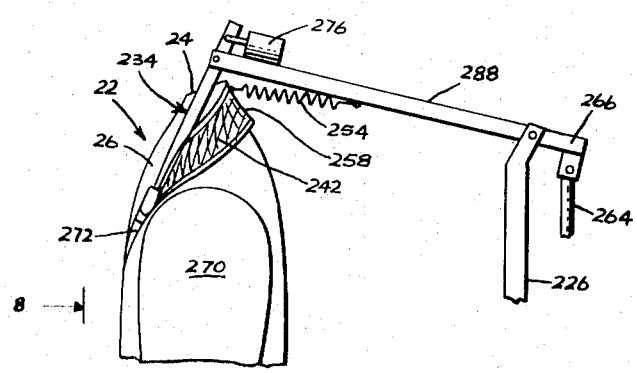

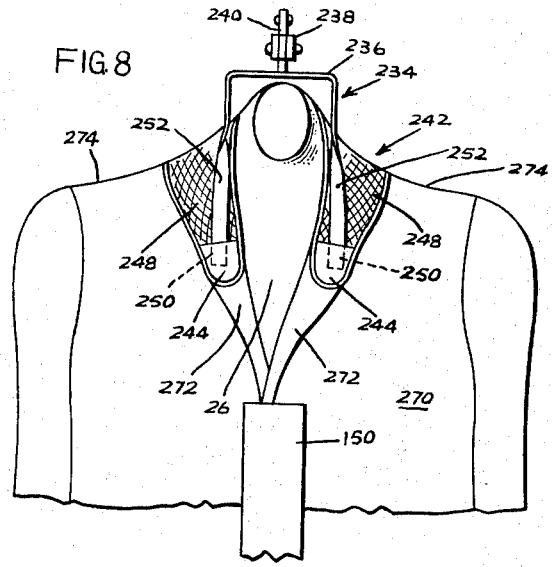
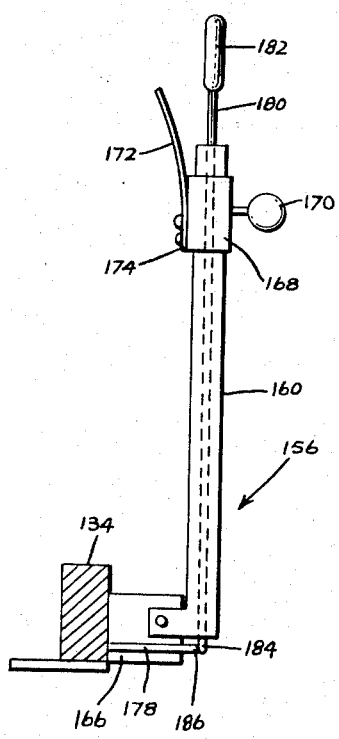
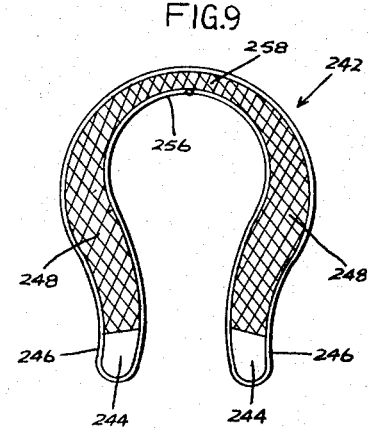
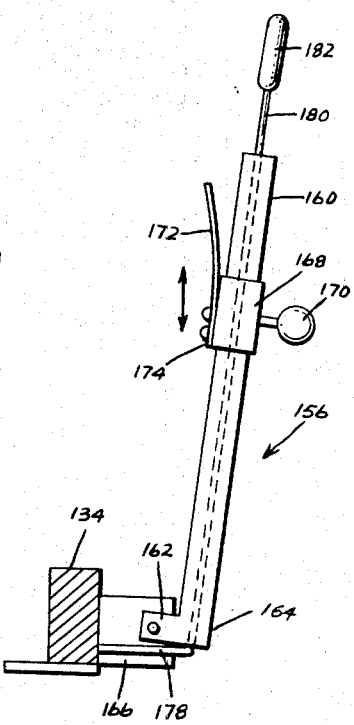
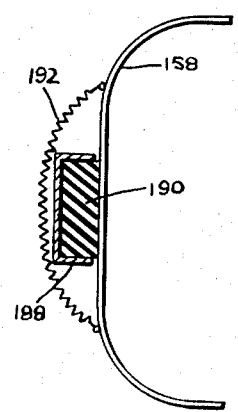

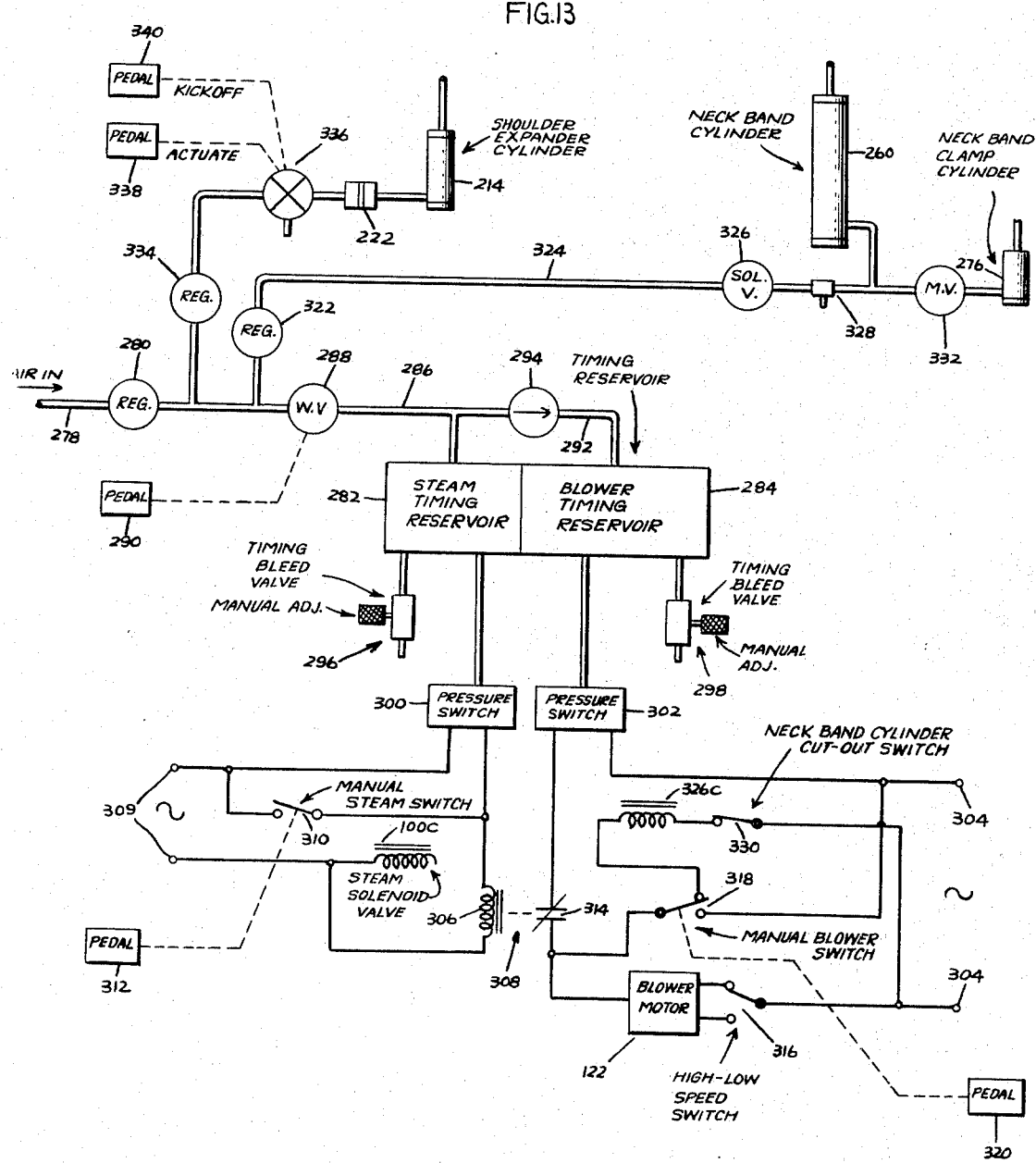

United States Patent Office 3,715,064
Patented Feb. 6, 1973

3,715,064
GARMENT FINISHING APPARATUS
William L. North, Morristown, and George S. Eubank, Newport, Tenn., assignors to Forenta, Limited, Kincardine, Ontario, Canada
Filed Feb. 10, 1971, Ser. No. 114,253
Int. Cl. D06c 5/00
U.S. Cl. 223—57
32 Claims

ABSTRACT OF THE DISCLOSURE

A steam-air coat and dress finisher comprising an upstanding post having lower and upper ends, the lower end being supported on a base enclosure generally centrally of an opening in the top wall thereof. A buck is mounted on the upper end of the post and an inflatable bag is suspended therefrom surrounding the post and having an open lower end communicating with the opening in the top wall of the enclosure. The post has a cavity therein extending substantially between its ends and a chamber surrounds the post intermediate its ends in heat-transfer relationship therewith, the chamber including an exterior wall having passages therethrough communicating with the interior of the bag. A steam line is coupled to the post cavity and a conduit has one end communicating with the post cavity and its other end communicating with the chamber, the conduit having a valve therein for selectively admitting steam from the post cavity to the chamber for outward flow through the passages therein into the bag thereby to heat and moisten a garment which is suspended from the buck and which surrounds a portion of the bag. A blower in the enclosure forces air through the top wall opening and into the bag to inflate the bag and dry the garment thereon. In one embodiment, a generally U-shaped, relatively narrow band formed of relatively thin, flexible mesh material is provided selectively movable between an inactive position spaced from the buck and an active position with the band embracing the collar of the garment and its ends engaging the lapels thereby to restrain and finish the collar and lapels.

BACKGROUND OF THE INVENTION

Field of the invention

This invention relates generally to steam-air garment finishing apparatus, and more particularly to apparatus for finishing coats and dresses.

Description of the prior art

Garments are "finished" following washing or dry cleaning by first heating and moistening the garment thereby to relax the fibers of the material from which the garment is made, then forming the garment in the desired shape, and finally drying the garment while it is retained in the desired shape. The application of high pressing pressure is not necessary in order to finish a garment and in fact, high contact pressure is undesirable since it tends to produce shine or moire and may substantially shorten the life of the garment, particularly in the case of garments made of certain synthetic fibers.

Air-steam finishers have commonly been employed for finishing coats and dresses, such finishers conventionally comprising an inflatable bag suspended from a buck which shapes the collar and shoulder regions of the garment, the garment being suspended from the buck and surrounding at least a portion of the bag. Steam is first injected into the bag thereby to heat and moisten the garment thereon, and air under pressure is then forced into the bag which inflates the same thereby shaping and drying the garment. Certain prior coat finishers, such as that shown in U.S. Pat. No. 2,986,311 have employed a heated upper press plate which is moved into pressing engagement with the buck thereby to press the collar and shoulder regions of the garment. Another prior finisher shown in U.S. Pat. No. 3,477,621 employs an unheated, flexible gridplate which lightly engages the collar and lapels of the garment on the buck thereby restraining the same during the application of drying air to the garment so as to provide the desired crease extending around the back of the collar and downwardly along the lapels.

A problem encountered in the use of certain prior steam-air garment finishers has been the injection of steam which is too wet into the bag thereby resulting in saturation of both the bag and the garment so that neither is satisfactorily dried during the drying cycle. Further, prior steam-air finishers have employed complex electrical and/or pneumatic control systems for automatically programming the cycle of operation.

SUMMARY OF THE INVENTION

The invention, in its broader aspects, provides garment finishing apparatus comprising an elongated, upstanding post member having lower and upper ends. Means is provided for supporting the lower end of the post member, and means is mounted on the upper end of the post member for suspending a garment so as to surround at least a portion of the post member which extends downwardly from the upper end thereof. The post member has a cavity formed therein and means are provided for admitting steam to the cavity thereby to heat the post member. Means are provided for forming a chamber surrounding a portion of the post member intermediate its ends and in heat-transfer relationship therewith, the chamber means including an exterior wall having passages therethrough. Means including a valve are provided for selectively conducting steam from the cavity to the chamber for outward flow through the passages thereby to heat and moisten the garment.

In one embodiment, the suspending means comprises a buck having neck, front and shoulder portions for shaping the collar, lapel and shoulder regions of the garment, respectively, and means including a neck band are provided for selectively engaging the neck and front portions of the buck thereby to restrain and finish the collar and lapels of the garment thereon to the exclusion of the shoulder regions.

It is accordingly an object of the invention to provide improved garment finishing apparatus.

Another object of the invention is to provide improved garment finishing apparatus of the air-steam type.

A further object of the invention is to provide improved apparatus for finishing coats and dresses.

Yet another object of the invention is to provide improved apparatus for finishing garments having a collar and lapels wherein the collar and lapels are finished without using a heated pressing plate and the application of high contact pressures.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is an enlarged cross-sectional view showing the supporting post and steam injection portion of the apparatus of the invention;

FIG. 3 is a cross-sectional view taken generally along the line 3—3 of FIG. 2;

FIG. 4 is a fragmentary cross-sectional view taken generally along the line 4—4 of FIG. 3;

FIG. 5 is a fragmentary cross-sectional view taken generally along the line 5—5 of FIG. 1 and showing the shoulder expander mechanism of the apparatus of the invention;

FIG. 6 is a cross-sectional view taken generally along the line 6—6 of FIG. 1;

FIG. 7 is a fragmentary side view showing the neck band of the apparatus of FIG. 1 in its collar and lapel engaging position;

FIG. 8 is a front view taken generally along the line 8—8 of FIG. 7;

FIG. 9 is a top view of the neck band;

FIG. 10 is a fragmentary side view further illustrating the construction of the front and back clamps and showing a clamp in its released position;

FIG. 11 is a view similar to FIG. 10 but showing a clamp in its engaged position;

FIG. 12 is a cross-sectional view taken generally along the line 12—12 of FIG. 1;

FIG. 13 is a view schematically illustrating the control system of the invention; and FIG. 4 is a fragmentary cross-sectional view showing a modification of the shoulder expander mechanism.

DESCRIPTION OF THE PREFERRED EMBODIMENT

Figure 1:
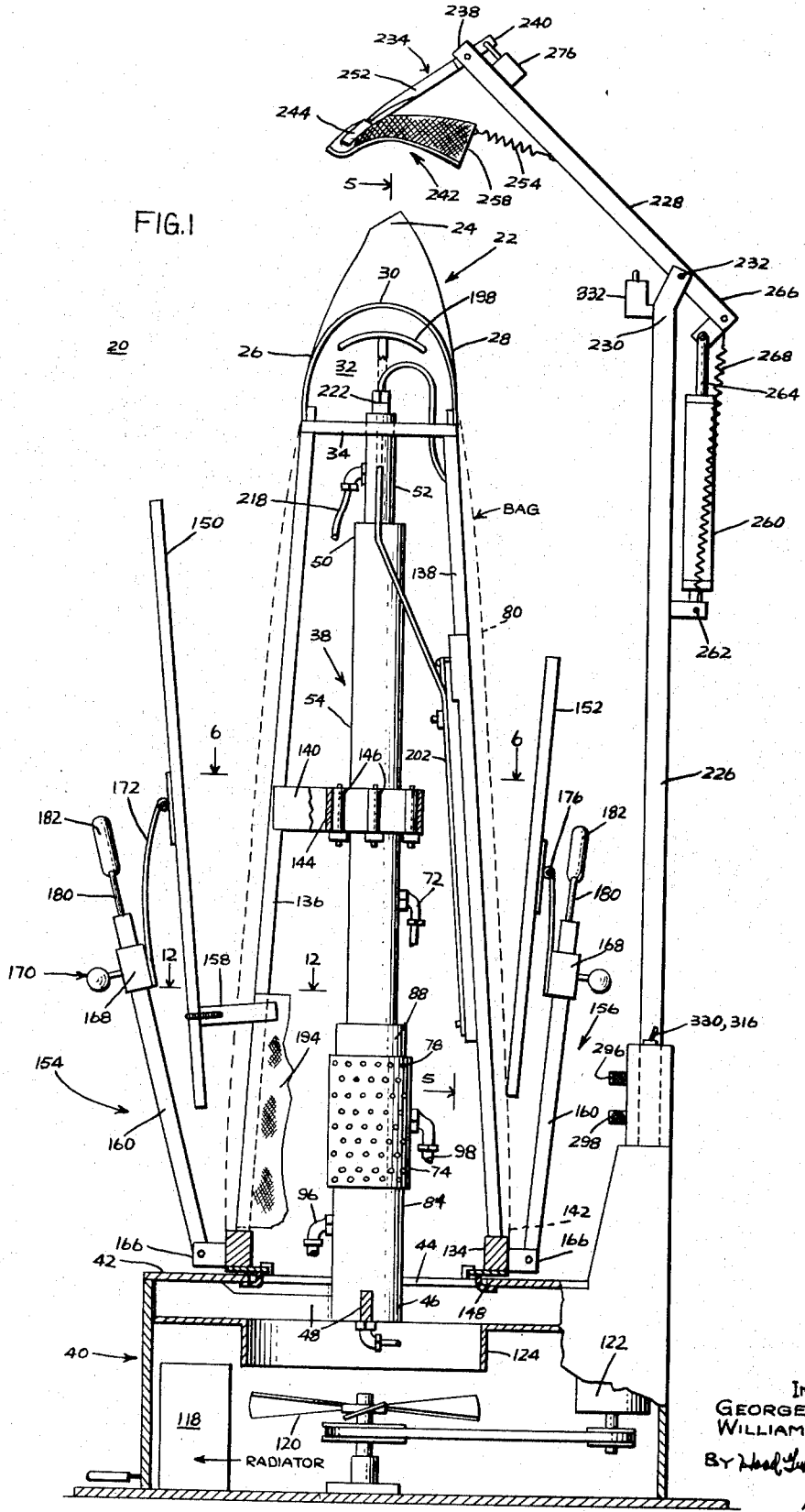
FIG. 1 is a side view, partly in cross-section and partly broken away, illustrating the preferred embodiment of the invention.

Referring now to FIGS. 1 through 9 of the drawings, the apparatus of the invention, generally indicated at 20 (FIG. 1) comprises rigid buck 22 formed of suitable metal, such as cast aluminum, having neck portion 24, front and back portions 26, 28 and fragmentary shoulder portions 30, shoulder portions 30 and front and back portions 26, 28 defining cavity 32. Front and back buck portions 26, 28 are mounted on support plate 34. Buck 22 is covered with suitable padding 36 (FIG. 5).

Buck 22 is rotatably supported by upstanding post member 38 (FIGS. 1 and 2). Base enclosure 40 is provided having top wall 42 with generally circular opening 44 formed therein. Lower end 46 of post 38 is supported on base enclosure 40 by suitable support elements 48, post member 38 extending upwardly through opening 44 and being generally coaxial therewith. Upper end 50 of post member 38 has an extension portion 52 formed thereon on which support plate 34 is pivotally mounted.

Post member 38 comprises hollow tube 54 formed of suitable metal, such as steel, closed at lower and upper ends 46, 50 by plates 56, 58, respectively, thereby to define cavity 60 extending between the lower and upper ends of tube 54 (FIG. 2). Extension portion 52 comprises another hollow tube having lower end 62 mounted on plate 58 and upper end 64 closed by plate 66 to define another cavity 68. Bearing post 70 is secured to top plate 66 and rotatably journals support plate 34 of buck 22.

Steam inlet line 72 which is connected to a suitable source of steam (not shown) is coupled to tube 54 and communicates with cavity 60 for admitting steam thereto. Cavity 60 is continuously supplied with steam thus heating tube 54. Sleeve 74 formed of suitable metal, such as aluminum, surrounds tube 54 defining chamber 76 with the outer wall of tube 54. Sleeve 74 has a plurality of passages or perforations 78 formed therein communicating between chamber 76 and the interior of inflatable bag 80 (shown in dashed lines in FIG. 1) which is suspended from buck 22. Lower end 82 of sleeve 74 is supported on outer tube 84 which surrounds tube 54 adjacent lower end 46, sealing ring 86 being positioned between lower end 82 of sleeve 74 and tube 84. Sleeve 74 is clamped in position by clamping ring 88 secured to tube 54 and with sealing ring 90 engaging upper end 92 of sleeve 74.

Steam conduit 94 has end 96 communicating with cavity 60 through tubes 54 and 84 and end 98 communicating with chamber 76 through sleeve 74. Solenoid-actuated valve 100 is coupled in conduit 94 (FIG. 2). Thus, upon actuation of valve 100, steam is admitted from cavity 60 into chamber 76 for outward flow through perforations 78 into bag 80, as shown by arrows 102. Diffuser element 104 formed of suitable metal mesh material, such as aluminum, is disposed in chamber 76 for diffusing the steam admitted thereto from end 98 of conduit 94 upon actuation of valve 100. Referring particularly to FIGS. 3 and 4, a pair of vertically extending grooves 106 are formed in inner wall 108 of sleeve 74 and communicate with end 98 of conduit 94 for distributing the entering steam into diffuser element 104. Further, a plurality of circumferentially extending grooves 110 are formed in inner wall 108 of sleeve 74 for distributing the steam to perforations 78. Sleeve 74 is preferably initially formed as a flat plate with perforations 78 being drilled therethrough and grooves 106, 110 being milled in surface 108. The plate is then rolled into its cylindrical configuration thus forming joint 112.

Drain line 114 communicates with cavity 60 through bottom plate 56 and tubing 116 of radiator 118 is coupled thereto. Radiator 118 and bladed fan 120 are positioned in base enclosure 40. Fan 120 is driven by conventional two-speed motor 122. Shroud 124 (FIG. 1) directs air delivered by fan 120 upwardly through opening 44 into the interior of bag 80, the air delivered by fan 120 being drawn over radiator 118 and heated thereby.

Condensate line 126 has one end 128 coupled to drain line 114 and its other end 130 coupled to end 96 of conduit 94. Line 126 includes coil 131 in the air stream of fan 120 thereby condensing that portion of the steam exhausted from cavity 60 which is diverted to line 126. Manually adjustable valve 132 is provided in line 126 thereby to feed a controlled amount of condensate to conduit 94 so as to control the wetness of the steam injected into bag 80.

Ring 134 is suspended from top plate 34 by a pair of downwardly inclined plate members 136, 138 joined intermediate their ends by a pair of side plate members 140 (FIG. 6). Bag 80 has its lower, open end 142 secured to ring 134 which is disposed adjacent the upper surface of top plate 42. Ring 144 is secured to side plates 140 and rotatably engages rollers 146 rotatably mounted on tube 54 thus providing a centering mechanism for the assembly comprising plate members 136, 138 and ring 134. Flexible, annular seal member 148 is attached to ring 136 and overlays the bottom surface of top plate 42. It will be observed that the air delivered by fan 120 will force seal 148 into engagement with the bottom surface of top plate 42 thus providing a seal for ensuring that all the air delivered by fan 120 enters bag 80 and also so that the steam in bag 80 will not leak or blow out.

Plates 136, 138 are disposed inside of bag 80 and cooperate with movable clamping plates 150, 152 of front and back clamp assemblies 154, 156. Apart from the fact that the front clamp plate 150 is longer than rear clamp plate 152 and incldues bag sizing element 158, front and back assemblies 154, 156 are substantially identical and thus detailed description of rear clamp assembly 156 will suffice.

Referring now to FIGS. 10 and 11, each of the clamp assemblies 154, 156 comprises an elongated tube 160 having an extension 162 formed on its lower end 164 which is pivotally mounted on bracket 166 extending outwardly from ring 134. Sleeve 168 is slidably adjustable longitudinally on tube 160 and is secured in any selected position by means of a hand-actuated knob 170. Leaf spring 172 has lower end 174 secured to sleeve 168. Movable clamping plate 150 or 152 is pivotally mounted on upper end 176 of spring 172. Pin 178 extends outwardly from ring 134 and is engaged by lower end 164 of tube 160 in its released position, thereby limiting the outward pivotal movement of the clamp assembly, as shown in FIG. 10. Rod 180 extends through tube 160 and has actuating handle 182 at its upper end. When tube 160 is pivoted forwardly to its upstanding position, as shown in FIG. 11, thereby to cause movable clamp plate 150 or 152 to engage stationary plate 136 or 138 (with bag 80 and the garment thereon disposed therebetween), rod 180 moves downwardly so that lower end 184 engages distal end 186 of pin 178, thus retaining the clamp assembly in its upright, clamping position. When it is desired to release the clamping assembly, it is merely necessary manually to raise rod 180 by means of handle 182 which thus disengages lower end 184 from pin 178, in turn permitting tube 160 to pivot rearwardly to the released position as shown in FIG. 10.

Referring to FIG. 12, each of the movable clamps 150, 152 comprises an elongated channel member 188 having element 190 formed of suitable spongy material, such as polyurethane foam, positioned therein and extending slightly outwardly therefrom, element 190 thus engaging the garment positioned on buck 22 and bag 80. Generally U-shaped bag sizing element 158 is movably attached to front clamp 150 by means of a suitable coil spring 192. It will be observed that front clamp 154 may be manually adjusted by knob 170 when the clamp is at its engaged or locked position. This permits a downward adjustment of front clamp 154 after plate 150 has been engaged with the front of a garment thereby applying a slight tension thereon thus smoothing, fitting and positioning the lapel and neck band area of the garment.

A cloth sop sleeve 194 surrounds the lower extremities of plates 136, 138 and serves to absorb any water which may be ejected by sleeve 74 thus permitting such water from saturating bag 80 and spotting the garment.

Referring now particularly to FIGS. 1, 2 and 5, a pair of shoulder expanders 196, 198 are respectively mounted on lever members 200, 202 having their lower ends pivotally mounted on plate member 204 secured to the flanges of plate member 138. It will thus be seen that shoulder expanders 196, 198 are pivotally movable between an extended position as shown in solid lines in FIG. 5 and a retracted position substantially within cavity 32 in buck 22, as shown in dashed lines.

Shoulder expanders 196, 198 are moved between their retracted and expanded positions by means of a pair of links 206, 208, respectively having their outer ends pivotally connected to lever members 200, 202 and their inner ends pivotally connected on a common pivot point 210 to plate 212 slidably mounted on plate 138. Plate 212 is actuated between upper and lower positions by means of a pneumatic cylinder 214 supported on support plate 34. It will be seen that extension of piston rod 216 of cylinder 214 which moves plate 212 downwardly will pivotally move lever members 200, 202 outwardly thereby to extend shoulder expanders 196, 198, whereas retraction of piston rod 216 under the influence of spring 217 so as to move plate 212 upwardly will pivotally move lever members 200, 202 inwardly thus retracting shoulder expanders 196, 198. A coil spring 211 interconnects lever members 200, 202 and serves normally to bias the lever members and shoulder expanders 196, 198 to the retracted position.

Air line 218 which is adapted to be connected to a source of air under pressure (not shown) is coupled to cavity 68 in extension 52 of post member 38. Bearing post 70 has passage 220 formed therein communicating with cavity 68 and a suitable rotatable coupling or gland 222. Air line 224 connects coupling 222 to cylinder 214, thus accommodating rotation of buck 22 and the sleeve expander assembly.

Referring now to FIGS. 1 and 7 through 9, post member 226 extends upwardly from base enclosure 40. Arm 226 is pivotally mounted on upper end 230 of post 228, as at 232. Generally U-shaped member 234 is provided having bight portion 236 pivotally mounted on outer end 238 of arm 228 by lever member 240. Generally U-shaped, relatively narrow, neck band 242 is provided formed of relatively thin, flexible, mesh material such as porous metal mesh or cloth. In a specific embodiment, neck band 242 is formed of Monel mesh and has its inner, garment-engaging surface covered with asbestos cloth. A pair of pockets 244 are formed on the outer surface of neck band 242 adjacent ends 246 of leg portions 248. Ends 250 of leg portions 252 of U-shaped member 234 are seated in pockets 244 and coil spring 254 is connected between the upper peripheral edge 256 of bight portion 258 of neck band 242 and a point on arm 228 spaced rearwardly from outer end 238.

Arm 228 and neck band 242 are moved between an upper, inactive position spaced from buck 22, as shown in FIG. 1, and a lower, active position, as shown in FIGS. 7 and 8, by means of pneumatic cylinder 260 pivotally connected to post 226, as at 262, and having its piston rod 264 pivotally connected to end 266 of arm 228. It will thus be seen that extention of piston rod 264 of cylinder 260 will pivot arm 228 and neck band 242 downwardly from the upper, inactive position, as shown in FIG. 1, to the lower, active position, as shown in FIGS. 7 and 8, whereas retraction of piston rod 264 will raise arm 228 and neck band 242 to the inactive position. Coil spring 268 normally biases arm 228 and neck band 242 to the upper, inactive position. In a specific embodiment, two cylinders 260 and springs 268 were employed due to the additional weight of a cover (not shown) on arm 228.

Referring particularly to FIGS. 7 and 8 in which a conventional coat 270 is shown dressed on buck 22 (with shoulder expanders 196, 198 expanded, as above-described), it will be seen that the collar of coat 270 surrounds neck portion 24 of buck 22 and that the lapels 272 extend downwardly over front portion 26. In the lower, active position of arm 228, neck band 242 embraces neck portion 24 of buck 22 and the collar of the garment positioned thereon and leg portions 248 extend downwardly over front portion 26 in engagement with lapels 272. It will be seen that neck band 242 engages the collar and lapels of the coat to the exclusion of the shoulder regions 274. Neck band 242 is pulled downwardly into engaging relationship with the collar and lapels of the coat 270 by the downward force exerted by ends 250 of leg portions 252 of U-shaped member 234 which are engaged in pockets 244. Particular reference to FIG. 7 will reveal that when neck band 242 is in its active collar and lapel engaging position, it is tilted forwardly (with respect to its inactive position as shown in FIG. 1) against the force exerted by spring 254.

In order to ensure that ends 244 of leg portions 248 of neck band 242 are urged into engagement with lapels 272 of coat 270, another pneumatic cylinder 276 is provided mounted on arm 228 and having its piston rod pivotally connected to lever member 240. Thus, extension of the piston rod of cylinder 276 will pivot U-shaped member 234 so as to cause ends 250 of leg portions 252 to urge ends 244 of leg portions 248 of neck band 242 into engagement with lapels 272. Neck band 242 in its active position lightly engages and retains the collar and lapel portions of coat 270 thereby to finish the same, only very small contact pressure (with respect to the pressing pressures ordinarily employed) being required to form the desired crease around the back of the collar and extending downwardly along the lapels. It will be observed that neck band 242 is not heated, it having been found that entirely satisfactory finishing of the collar, lapel and shoulder regions of the coat can be accomplished without employment of a heated pressing head and that the desired crease around the back of the collar and on the lapels can be provided with very light contact pressure applied by neck band 242.

Referring now to FIG. 13, air line 278 is adapted to be connected to a suitable source of high pressure air (not shown) such as at 90–100 p.s.i. Regulator 280 in line 278 initially reduces the pressure to a predetermined value, such as on the order of 80 p.s.i. Steam timing air reservoir 282 and blower timing air reservoir 284 are provided. Steam timing reservoir 282 is coupled to regulator 280 by air line 286 having whistle valve 288 therein actuated by foot pedal 290. Blower timing reservoir 284 is coupled to line 286 by line 292 having check valve 294 therein. Blower timing reservoir 284 has a volumetric capacity substantially greater than the capacity of steam timing reservoir 282. In a specific embodiment, steam timing reservoir 282 comprises a cylindrical tank three inches in diameter and five inches long whereas, blower timing reservoir 284 comprises a cylindrical tank three inches in diameter and ten inches long. It will now be readily seen that momentary actuation of foot pedal 290 to open whistle valve 288 will result in initially charging steam and blower timing reservoirs 282, 284 with air at the pressure established by regulator 280.

Steam timing reservoir 282 has a manually adjustable bleed valve 296 coupled thereto and blower timing reservoir 284 has a similar manually adjustable bleed valve 298 coupled thereto. It will thus be seen that immediately upon initial charging of the reservoirs 282, 284, exhausting of the air from the reservoirs will commence through bleed valves 296, 298, the time required for exhausting the respective reservoir depending upon the adjustment of the respective bleed valve. With the specific air pressure and volumetric capacity of the reservoirs 282, 284 described above, bleed valve 296 will exhaust the air from steam timing reservoir 282 over a period of time ranging from 0 to 1 minute, depending upon the setting of bleed valve 296, whereas bleed valve 298 will exhaust the air from blower timer reservoir 284 over a period of time ranging from 0 to 4 minutes, depending again upon the setting of bleed valve 298.

Pressure switch 300 is coupled to steam timing reservoir 282 and another pressure switch 302 is coupled to blower timing reservoir 284. In a specific embodiment, pressure switches 300, 302 are the type which will be actuated to close their contacts in response to a pressure differential of approximately 20 p.s.i. Pressure switch 300 couples coil 100c of steam valve 100 (FIG. 2) for energization across a suitable source 304 of energizing potential (not shown) in response to air pressure in steam timing reservoir 282 above a predetermined value, such as 20 p.s.i., and de-energizes coil 100c in response to the pressure in reservoir 282 falling below that predetermined value. Operating coil 306 of relay 308 is coupled in parallel across coil 100c of solenoid valve 100. Switch 310 actuated by a foot pedal 312 coupled coil 100c directly across source 304 to provide for manual control of steaming of the garment when desired.

Pressure switch 302 and normally closed contacts 314 of relay 308 couple blower motor 122 for energization across source 304 in response to the pressure in blower timing reservoir 284 being above a predetermined value, such as 20 p.s.i., and de-energizes blower motor 122 in response to the pressure in reservoir 284 falling below such value. It will be observed that while pressure switch 300 is energizing steam valve coil 100c and relay operating coil 306, contacts 314 will be opened and thus that the operation of blower motor 122 is inhibited during the predetermined period of time (as determined by adjustment of bleed valve 296) during which steam is being injected into bag 20. When the pressure in steam timing reservoir 282 falls below the predetermined value, such as 20 p.s.i., pressure switch 300 de-energizes steam valve coil 100c thus to terminate injection of steam into the bag and also de-energizes relay operating coil 306 thereby closing contacts 314. By reason of the much greater volumetric capacity of blower timing reservoir 284, the pressure therein will still be substantially above the predetermined value at which pressure switch 302 will open its contacts, and thus closing of contacts 314 will energize blower motor 122 to initiate delivery of air to bag 80 by fan 120. It will thus be seen that with this control system, injection of steam into the bag is terminated prior to initiation of delivery of the drying air thereto. A manually operated switch 316 determines, at the operator's discretion, whether blower motor 122 is operated at high or low speed.

Switch 318 actuated by foot pedal 320 connects blower motor 122 directly across source 304 thereby permitting manually controlled injection of air into bag 80 at the discretion of the operator.

Another regulator 322, for example set to 60–70 p.s.i., is coupled to regulator 280 and air line 324 couples regulator 322 to neck band cylinder 260. Solenoid valve 326 is positioned in air line 324 and metering exhaust orifice 328 is coupled between valve 326 and cylinder 260. Coil 326c of solenoid valve 326 is coupled across pressure switch 302 by manually actuated neck band cylinder cut-off switch 330 and by switch 318 in its de-actuated position. Thus, with the switch 330 closed and with 318 deactuated, it will be understood that immediately upon charging of blower timing reservoir 284 resulting in actuation of pressure switch 302 to close its contacts, coil 326c will be energized thereby opening solenoid valve 326 so as to actuate neck band cylinder 260 to move arm 228 and neck band 242 to the active position, as above-described. Thus, neck band 242 is in its active position only during the automatic drying cycle. Actuation of switch 318 by foot pedal 320 to provide manually controlled blower operation opens the circuit of neck band solenoid coil 326c and then, neck band 242 is actuated only during the automatic cycle. Coil 326c is de-energized thereby to close solenoid valve 326 and to cause retraction of cylinder 260 (under the influence of springs 268) so as to raise arm 228 and neck band 242 to the active position simultaneously with de-energization of blower motor 122 when the air pressure in reservoir 284 falls below the predetermined value. If the garment being finished is not of the type which requires utilization of neck band 242, manually actuated switch 330 is opened thus disconnecting coil 326c and inhibiting actuation of valve 326.

Referring now additionally to FIG. 1, neck band clamp cylinder 276 is coupled to neck band cylinder 260 by microvalve 332. Microvalve 332 is actuated when arm 228 is lowered to its active position thereby admitting air to clamp cylinder 276.

Another regulator 334 is coupled to main regulator 280 and is set, for example, to approximately 20–30 p.s.i. Valve 336 and rotatable coupling 222 couple regulator 334 to shoulder expander cylinder 214. Valve 336 is actuated to its open position by foot pedal 338, thereby applying air to cylinder 214 to actuate shoulder expanders 196, 198 to their expanded positions (FIG. 5). Valve 336 is actuated to its closed and exhaust position by kick-off foot pedal 340 thereby to remove air from cylinder 214 and cause retraction of shoulder expanders 196, 198 under the influence of spring 211.

In the operation of the above-mentioned specific embodiment of the apparatus of the invention, charging of the steam and blower timing reservoirs 282, 284 to the full pressure supplied by regulator 280 requires something less than one second. For a typical normal cycle of operation, steam timing bleed valve 296 is adjusted to reduce the air pressure in steam timing reservoir 282 to the value to actuate pressure switch 300 so as to de-energize steam valve coil 100c and relay operating coil 306 in about six seconds, i.e., steam solenoid valve 100 is actuated to inject steam into bag 80 for approximately six seconds. Likewise, in a normal cycle of operation, blower timing bleed valve 298 is adjusted to reduce the air pressure in blower timing reservoir 284 to the value at which pressure switch 302 is actuated in about 30 seconds. Recalling that energization of blower motor 122 is inhibited by the opening of relay contacts 314 while steam valve coil 100c is energized for approximately six seconds, it will be seen that the duration of the drying cycle during which blower motor 122 is energized will be approximately 24 seconds.

It will be observed that the operator may selectively vary the steam time manually without changing the settings of bleed valves 296, 298. This may be accomplished by depressing automatic charge pedal 290 for a period of time longer than the normal one second required to charge steam timing reservoir 282 with the result that the steam time will be increased by the delay in excess of one second in releasing pedal 290. Upon release of pedal 290, the timing system will continue into the automatic cycle as determined by the setting of bleed valves 296, 298. Thus, the operator may vary the steam time in the automatic cycle in order to satisfy the requirements of different types of fabrics.

Referring now to FIG. 14 in which like elements are indicated by like reference numerals, there is shown a modification of the shoulder expander mechanism employing two pneumatic cylinders 342, 344 which provide a high/low range capability. Cylinders 342, 344 are supported on support plate 34 and have their piston rods connected to plate 212 to which links 206, 208 which actuate shoulder expanders 196, 198 are pivotally connected, as at 210.

Line 346 couples cylinder 342 to rotatable gland 222, air being supplied to gland 222 by cavity 68 in extension 52 of post member 38 and valve 336 actuated by foot pedal 338, as above described. Line 348 also couples gland 222 to two-way toggle valve 350 supported on neck portion 24 of buck 22. Line 352 couples valve 350 to cylinder 344, line 352 having a first orifice 354 and a second orifice 356 therein.

Cylinder 342 provides the low range operation. When manual actuator 358 of toggle valve 350 is in its "low" position, as shown by dashed line 356a, valve 350 is closed. When foot pedal 338 is depressed, air is supplied to cylinder 342 causing extension of its piston rod and extension of shoulder expanders 196, 198 approximately half-way to their fully expanded positions, orifice 356 venting the inactive cylinder 344 to prevent a vacuum bind. This low range operation is provided in order to prevent an operator from over-stretching a light, small garment.

When high range operation is desired, actuator 358 of toggle valve 350 is moved to its high position, as shown in solid lines in FIG. 14, thus applying air to both cylinders 342, 344 so that shoulder expanders 196, 198 move slowly to their fully expanded positions. Optionally, the operator may jog actuator 358 of toggle valve 350 quickly between the low and high range positions (always returning to the low position) thus providing several intermediate positions of the shoulder expanders 196, 198 between the half-extended and fully extended positions.

An important feature of the high/low range sleeve expander mechanism of FIG. 14 is the adjustment of orifices 354, 356 relative to each other. Orifice 356 is a selectively adjustable fitting while orifice 354 is squeezed into line 352 very nearly closing the same. So long as orifice 356 will pass a greater flow of air than orifice 354, high range cylinder 344 will not pressurize. Thus, the size of orifice 356 is slowly reduced until cylinder 344 becomes operable. Low range cylinder 342 alone actuates expanders 196, 198 to only approximately one-half their fully extended position since it does not exert sufficient force to fully overcome springs 211 (FIG. 5) and 217. When toggle valve 350 is open, the combined force exerted by low range cylinder 342 and high range cylinder 344 is sufficient to overcome the spring force, orifices 354, 356 providing a gentle, slow extension of the expanders as above described.

It will be readily understood that for the finishing of many garments, the neck band 242 is not required and thus that the entire neck band operating assembly 226, 228, 260 may be eliminated from the apparatus.

While there have been described above the principles of this invention in connection with specific apparatus, it is to be clearly understood that this description is made only by way of example and not as a limitation to the scope of the invention.

What is claimed is:

1. Garment finishing apparatus comprising an elongated, upstanding post member having lower and upper ends, means for supporting said lower end of said post member, means mounted on said upper end of said post member for suspending a garment so as to surround at least a portion of said post member extending downwardly from said upper end thereof, said post member having a cavity formed therein, means for admitting steam to said cavity thereby to heat said post member, means for forming a chamber surrounding a portion of said post member intermediate said ends and in heat-transfer relationship therewith, said chamber means including an exterior wall having passages therethrough, and means including a valve for selectively conducting steam from said cavity to said chamber for outward flow through said passages thereby to heat and moisten said garment, said cavity extending substantially between said lower and upper ends of said post member, said post member comprising a hollow, cylindrical metal tube, said chamber means wall comprising a tubular metal sleeve defining a second cavity with the outer surfaces of said tube, said passages comprising perforations in said sleeve, said conducting means comprising a conduit having one end communicating with said first-named cavity through the wall of said tube and its other end communicating with said second cavity through said sleeve, said conduit extending between said ends thereof exteriorly of said tube and sleeve, said valve being coupled in said conduit intermediate said ends thereof.

2. The apparatus of claim 1 further comprising means in said second cavity for diffusing the steam admitted thereto.

3. The apparatus of claim 2 wherein the inner surface of said sleve has grooves formed therein for conducting steam to said perforations.

4. Garment finishing apparatus comprising an elongated, upstanding post member having lower and upper ends, means for supporting said lower end of said post member, means mounted on said upper end of said post member for suspending a garment so as to surround at least a portion of said post member extending downwardly from said upper end thereof, said post member having a cavity formed therein, means for admitting steam to said cavity thereby to heat said post member, means for forming a chamber surrounding a portion of said post member intermediate said ends and in heat-transfer relationship therewith, said chamber means including an exterior wall having passages therethrough, means including a valve for selectively conducting steam from said cavity to said chamber for outward flow through said passages thereby to heat and moisten said garment, an inflatable bag suspended from said suspending means, said garment surrounding at least a portion of said bag extending downwardly from said suspending means, a base enclosure including a top wall having an opening therein, said supporting means supporting said post member on said enclosure generally centrally of said opening, said bag having an open lower end communicating with said opening adjacent the upper surface of said top wall, air moving means in said enclosure for forcing air through said opening and into said bag thereby to inflate the same and to dry the garment thereon, said suspending means comprising a buck for shaping the collar and shoulder portions of said garment, and means for rotatably mounting said buck on said upper end of said post member, a ring member surrounding said post member and opening adjacent said upper surface of said top wall, said lower end of said bag being secured to said ring member, and means for suspending said ring member from said buck.

5. The apparatus of claim 4 further comprising a rotating seal disposed between said ring member and opening.

6. Garment finishing apparatus comprising an elongated, upstanding post member having lower and upper ends, means for supporting said lower end of said post member, means mounted on said upper end of said post member for suspending a garment so as to surround at least a portion of said post member extending downwardly from said upper end thereof, said post member having a cavity formed therein, means for admitting steam to said cavity thereby to heat said post member, means for forming a chamber surrounding a portion of said post member intermediate said ends and in heat-transfer relationship therewith, said chamber means including an exterior wall having passages therethrough, means including a valve for selectively conducting steam from said cavity to said chamber for outward flow through said passages thereby to heat and moisten said garment, said suspending means comprising a buck for shaping the collar and shoulder portions of said garment, said upper end of said post member having a projection extending upwardly therefrom, said buck being rotatably mounted on said projection, a pair of shoulder expanders, means for mounting said shoulder expanders for movement between extended and retracted positions, at least one fluid-power cylinder coupled to actuate said expanders between said positions thereof, said projection having another cavity therein, means for admitting fluid under pressure to said other cavity, and means including a rotatable coupling for conducting said fluid from said other cavity to said cylinder thereby to actuate the same.

7. The apparatus of claim 6 wherein there are two fluid-power cylinders each coupled to actuate said expanders, said mounting means including spring means for normally urging said expanders to said retracted positions, said last-named connecting means including a first fluid line directly connecting said rotatable coupling to a first of said cylinders and a second fluid line having a selectively actuable valve therein connecting said rotatable coupling to the second of said cylinders, said first cylinder exerting only sufficient force partially to overcome said spring means thereby to actuate said expanders to a point intermediate said retracted and extended positions when said valve is closed, said cylinders collectively having a sufficient force to overcome said spring means thereby to actuate said expanders to their fully extended positions when said valve is open.

8. The apparatus of claim 7 wherein said second fluid line has at least one restriction therein for controlling the rate of movement of said expanders to said extended positions.

9. The apparatus of claim 6 wherein there are two fluid-power cylinders each coupled to actuate said expanders, said mounting means including spring means for normally urging said expanders to said retracted positions, said last-named connecting means including a first fluid line directly connecting said rotatable coupling to a first of said cylinders and a second fluid line having a selectively actuable valve therein connecting said rotatable coupling to the second of said cylinders, said first cylinder exerting only sufficient force partially to overcome said spring means thereby to actuate said expanders to a point intermediate said retracted and extended positions when said valve is closed, said cylinders collectively having sufficient force to overcome said spring means thereby to actuate said expanders to their fully extended positions when said valve is open.

10. The apparatus of claim 9 wherein said second fluid line has at least one restriction therein for controlling the rate of movement of said expanders to said extended positions.

11. The apparatus of claim 9 wherein said engaging means comprises a generally U-shaped, relatively narrow band formed of relatively thin, flexible mesh material, and means for selectively moving said band from an inactive position spaced from said buck to an active position with said band embracing said neck portion and its ends engaging said front portion of said buck.

12. The apparatus of claim 11 wherein said moving means comprises an arm having an outer end and means for pivotally mounting the same for movement of said end between said inactive and active positions, a generally U-shaped member having its bight portion mounted on said arm adjacent said outer end thereof, said ends of said band being respectively attached to the ends of said U-shaped member.

13. The apparatus of claim 12 further comprising a spring connected between the bight portion of said band and a point on said arm spaced from said outer end thereof.

14. The apparatus of claim 13 wherein said U-shaped member is pivotally mounted on said arm, and further comprising a fluid power cylinder mounted on said arm for pivoting said U-shaped member to a position in which said ends of said U-shaped member urge said ends of said band into engagement with said front portion of said buck.

15. Garment finishing apparatus comprising an elongated, upstanding post member having lower and upper ends, means for supporting said lower end of said post member, means mounted on said upper end of said post member for suspending a garment so as to surround at least a portion of said post member extending downwardly from said upper end thereof, said post member having a cavity formed therein, means for admitting steam to said cavity thereby to heat said post member, means for forming a chamber surrounding a portion of said post member intermediate said ends and in heat-transfer relationship therewith, said chamber means including an exterior wall having passages therethrough, means including a valve for selectively conducting steam from said cavity to said chamber for outward flow through said passages thereby to heat and moisten said garment, means for delivering air under pressure into the interior of said garment thereby to dry the same, and a control system for actuating said valve and said air delivering means for predetermined times in a predetermined sequence, said control system including first and second air reservoirs, means for initially charging said reservoirs with air under pressure thereby to initiate a cycle of operation, first and second selectively adjustable means for respectively bleeding air from said reservoirs whereby the air initially charged in each of said reservoirs is exhausted over a selectively adjustable period of time, first means coupled to said first reservoir for actuating said valve to admit steam to said chamber in response to air pressure in said first reservoir above a predetermined value for deactuating said valve in response to air pressure below such value, and second means coupled to said second reservoir for actuating said air delivering means to deliver air in response to air pressure in said second reservoir above a predetermined value and for deactuating said air delivering means in response to air pressure below such value.

16. The apparatus of claim 15 wherein said charging means comprises an air line coupling said reservoirs to a source of air under pressure, and a manually actuated valve in said air line, said valve being adapted to charge said reservoirs when opened for a predetermined time whereby maintaining said valve open for a period of time in excess of said predetermined time prolongs actuation of said valve to admit steam to said chamber by said excess period.

17. The apparatus of claim 15 wherein said first and second bleeding means, respectively, comprise first and second manually adjustable bleeding valves respectively coupled to said first and second reservoirs.

18. The apparatus of claim 15 wherein said charging means comprises an air line coupling said reservoirs to a source of air under pressure, and a manually actuated valve in said air line, said manually actuated valve being adapted to charge said reservoirs when opened for a predetermined time whereby maintaining said manually actuated valve open for a period of time in excess of said predetermined time prolongs actuation of said first-mentioned valve to admit steam to said chamber by said excess period.

19. The apparatus of claim 15 wherein said suspending means comprises a buck for shaping the collar and shoulder portions of said garment, and further comprising means for engaging at least said collar portion of said garment on said buck, and means for selectively moving said engaging means between an inactive position spaced from said buck and an active position in engagement with said collar portion, said moving means being coupled to said second actuating means and actuated thereby to said active position in response to air pressure in said second reservoir being above said predetermined value and to said inactive position in response to air pressure below such value.

20. The apparatus of clam 15 wherein said charging means comprises an air line for coupling said reservoirs to a source of air under pressure, and a manually actuated valve in said air line, said first-named valve being a solenoid-actuated valve, said air delivering means comprising a motor driven blower, said first and second actuating means, respectively, comprising first and second pressure switches for respectively coupling said first valve and motor to a source of energizing potential.

21. The apparatus of claim 20 wherein said second reservoir has substantially greater air storage capacity than said first reservoir, and further comprising means for inhibiting energization of said motor during energization of said first valve by said first pressure switch.

22. In garment finishing apparatus: a buck having neck, front and shoulder portions for shaping the collar, lapel and shoulder regions of a garment, respectively, a generally U-shaped, relatively narrow band formed of relatively thin, flexible mesh material, and means for selectively moving said band between an inactive position spaced from said buck and an active position with said band embracing said neck portion and its ends engaging said front portion of said buck thereby to restrain the collar and lapels of said garment.

23. The apparatus of claim 22 wherein said moving means comprises an arm having an outer end and means for pivotally mounting the same for movement of said end between said inactive and active positions, and a generally U-shaped member having its bight portion mounted on said arm adjacent said outer end thereof, said ends of said band being respectively attached to the ends of said U-shaped member.

24. The apparatus of claim 23 wherein a spring is connected between the bight portion of said band and a point on said arm spaced from said outer end thereof.

25. The apparatus of claim 23 wherein said U-shaped member is pivotally mounted on said arm, and further comprising a fluid power cylinder mounted on said arm for pivoting said U-shaped member to a position in which said ends of said U-shaped member urge said ends of said band into engagement with said front portion of said buck.

26. Garment finishing apparatus comprising an elongated, upstanding post member having lower and upper ends, means for supporting said lower end of said post member, means mounted on said upper end of said post member for suspending a garment so as to surround at least a portion of said post member extending downwardly from said upper end thereof, said post member having a cavity formed therein, means for admitting steam to said cavity thereby to heat said post member, means for forming a chamber surrounding a portion of said post member intermediate said ends and in heat-transfer relationship therewith, said chamber means including an exterior wall having passages therethrough, means including a valve for selectively conducting steam from said cavity to said chamber for outward flow through said passages thereby to heat and moisten said garment, said suspending means comprising a buck having neck, front and shoulder portions for shaping the collar, lapel and shoulder regions of said garment, respectively, and means for selectively engaging said neck and front portions of said buck thereby to restrain and finish the collar and lapels of a garment thereon to the exclusion of said shoulder regions.

27. In garment finishing apparatus including means for supporting a garment, means including a valve for injecting steam into the interior of said garment thereby to heat and moisten the same, and means for delivering air into the interior of said garment thereby to dry the same: a control system for actuating said valve and said air delivering means for predetermined times in a predetermined sequence comprising first and second air reservoirs, means for initially charging said reservoirs with air under pressure thereby to initiate a cycle of operation, first and second selectively adjustable means for respectively bleeding air from said reservoirs whereby the air initially charged in each of said reservoirs is exhausted over a selectively adjustable period of time, first means coupled to said first reservoir for actuating said valve to inject steam into said garment in response to air pressure in said first reservoir above a predetermined value and for deactuating said valve in response to air pressure below such value, and second means coupled to said second reservoir for actuating said air delivering means to deliver air in response to air pressure in said second reservoir above a predetermined value and for deactuating said air delivering means in response to air pressure below such value.

28. The apparatus of claim 27 further comprising means for engaging a portion of said garment on said supporting means, and means for selectively moving said engaging means between an inactive position spaced from said supporting means and an active position in engagement with said garment portion, said moving means being coupled to said second actuating means and actuated thereby to said active position in response to air pressure in said second reservoir being above said predetermined value and to said inactive position in response to air pressure below such value.

29. The apparatus of claim 27 wherein said first and second bleeding means, respectively, comprise first and second manually adjustable bleeding valves respectively coupled to said first and second reservoirs.

30. The apparatus of claim 27 wherein said charging means comprises an air line for coupling said reservoirs to a source of air under pressure, and a manually actuated valve in said air line, said first-named valve being a solenoid-actuated valve, said air delivering means comprising a motor driven blower, said first and second actuating means, respectively, comprising first and second pressure switches for respectively coupling said first valve and motor to a source of energizing potential.

31. The apparatus of claim 30 wherein said second reservoir has substantially greater air storage capacity than said first reservoir, and further comprising means for inhibiting energization of said motor during energization of said first valve by said first pressure switch.

32. In garment finishing apparatuses including a buck for shaping the collar and shoulder portion of a garment, an upstanding support member having a projection extending upwardly therefrom, said buck being rotatably mounted on said projection, a pair of shoulder expanders, means for mounting said shoulder expanders for movement between extended and retracted positions, at least one fluid-power cylinder coupled to actuate said expanders between said positions thereof, said projection having a cavity therein, means for admitting fluid under pressure to said cavity, and means including a rotatable coupling for conducting said fluid from said cavity to said cylinder thereby to actuate the same.

References Cited

UNITED STATES PATENTS

| | | | |
|---|---|---|---|
| 2,425,194 | 8/1947 | Lendle | 223—70 |
| 3,319,208 | 3/1967 | Killey | 223—70 |
| 2,986,311 | 5/1961 | Stiefel | 223—57 |
| 3,477,621 | 11/1969 | Forse | 223—57 |
| 3,052,388 | 9/1962 | Mutolese | 223—57 |
| 2,513,427 | 7/1950 | Richa et al. | 223—67 |
| 2,515,848 | 7/1950 | Winter | 223—67 |
| 2,140,961 | 12/1938 | Lendle | 223—70 |
| 2,736,472 | 2/1956 | Jackson | 223—67 |
| 3,512,703 | 5/1970 | Buckley et al. | 223—70 |
| 2,338,776 | 1/1944 | Miller | 223—67 |

JAMES R. BOLER, Primary Examiner

G. V. LARKIN, Assistant Examiner

U.S. Cl. X.R.

223—70